US012751385B2

(12) United States Patent
Fort

(10) Patent No.: US 12,751,385 B2
(45) Date of Patent: Oct. 6, 2026

(54) SEED-TO-HARVEST PASSIVE AEROPONIC SELF-WATERING PLANTING SYSTEMS AND THEIR USE

(71) Applicant: Kevin Fort, Davis, CA (US)

(72) Inventor: Kevin Fort, Davis, CA (US)

( * ) Notice: Subject to any disclaimer, the term of this patent is extended or adjusted under 35 U.S.C. 154(b) by 0 days.

(21) Appl. No.: 18/595,078

(22) Filed: Mar. 4, 2024

(65) Prior Publication Data

US 2025/0275508 A1 Sep. 4, 2025

(51) Int. Cl.
*A01G 27/00* (2006.01)
*A01G 27/04* (2006.01)

(52) U.S. Cl.
CPC ........... *A01G 27/04* (2013.01); *A01G 27/005* (2013.01)

(58) Field of Classification Search
None
See application file for complete search history.

(56) References Cited

U.S. PATENT DOCUMENTS 5,443,544 A * 8/1995 Azoulay ................ A01G 29/00 47/48.5
6,370,819 B1 * 4/2002 Reiss ....................... A01K 9/04 47/81
9,661,810 B2 5/2017 Walker, II
9,717,192 B1 * 8/2017 Danner .................. A01G 31/02
2013/0067812 A1 * 3/2013 Masters ................. A01G 27/02 47/81
2015/0033625 A1 * 2/2015 Jawarski .................. A01G 9/02
2017/0105368 A1 * 4/2017 Mehrman .............. A01G 25/02
2018/0228100 A1 * 8/2018 Gergek .................. A01G 27/00
2019/0289802 A1 * 9/2019 Herbert, Jr. ............ A01G 27/06
2022/0132759 A1 * 5/2022 Hill ........................ A01G 31/02

OTHER PUBLICATIONS

Argo and Biernbaum, The Effect of Irrigation Method, Water-soluble Fertilization, Replant Nutrient Charge, and Surface Evaporation on Early Vegetative and Root Growth of Poinsettia. J Am Soc. Horticulture Sci. 1995;120(2):163-169.
Argo, Root Medium Physical Properties. HortTechnology Oct.-Dec. 1998;8(4):481-485.
Schmal et al., Subirrigation for production of native plants in nurseries—concepts, current knowledge, and implementation. Native Plants J. 2011;12(2):81-93.
Semananda et al., A Semi-Systematic Review of Capillary Irrigation: The Benefits, Limitations, and Opportunities. Horticulturae 2018;4(3):1-15.

* cited by examiner

*Primary Examiner* — Joshua J Michener
*Assistant Examiner* — Henry Hooper Mudd
(74) *Attorney, Agent, or Firm* — Michael A. Whittaker

(57) ABSTRACT

A self-watering planting apparatus configured to promote the growth of aerial roots atop a thin layer of rooting media in a shallow passively humidified rooting chamber. The apparatus delivers water to the root system aeroponically via captured condensate that passively drips onto the aerial roots and via capillarity within the rooting media that extends continuously into a reservoir located beneath the rooting chamber.

3 Claims, 6 Drawing Sheets

SEED-TO-HARVEST PASSIVE AEROPONIC SELF-WATERING PLANTING SYSTEMS AND THEIR USE

FIELD OF THE INVENTION

This invention relates to planters configured for self-watering of plants.

BACKGROUND OF THE INVENTION

The following discussion of the background of the invention is merely provided to aid the reader in understanding the invention and is not admitted to describe or constitute prior art to the present invention.

Subirrigation refers generally to methods in which irrigation water is stored and/or is applied below the surface of the soil or rooting media. Capillary irrigation is a subset of subirrigation methods that uses the capillary or "wicking" capacity of selected materials, including soil and rooting media, to convey water from a reservoir below the root system to the roots (Schmal et al., Native Plants J. 12: 81-93, 2011; DOI: 10.3368/npj.12.2.81). Because capillary irrigation can be highly water use efficient, many methods and systems have been developed using this general principle (Semananda et al., *Horticulturae* 4(3): 23, 2018; DOI: 10.3390/horticulturae4030023). These methods can be generally divided into (1) mechanized systems that use a pump, or (2) passive systems. In nutrient static wick (NSW) systems, a type of passive system, some level of intervention or maintenance is required between the stages of seed planting and harvest.

Often a reservoir is of insufficient capacity to supply the plant with necessary water for the total duration of its cultivation and can require multiple replenishments. In some cases, the plant must be traditionally cultivated from a seed until the root system is sufficiently deep and networked to reach the zone of capillary-fed moisture. Alternatively, the plant can be cultivated externally using conventional methods for a period of weeks to months and then transplanted into the NSW system.

Subirrigation tends to salinize container media near the surface due to water evaporation that leaves behind soluble salts (Argo and Biernbaum, J. Am. Soc. Horticulture Sci. 120:163-169, 1995; DOI:10.21273/JASHS.120.2.163). Because most roots develop lower in the media profile, these surface salts do not pose immediate harm; however, care must be taken to avoid leaching these salts into the root zone from rainfall or overhead irrigation, which can result in salt toxicity.

U.S. Pat. No. 9,661,810 B2, May 30, 2017 discloses a "demand driven self-watering planter." The disclosed apparatus includes a partitioning element having a hollow tubular section that terminates in a center opening and a wide flange. The partitioning element is positioned in a bucket, thereby separating the container into an upper portion, which functions to hold the potting soil and a plant, a lower portion which functions as a reservoir for the liquid, and a common portion that projects into the reservoir which functions as an interface with the common portion and the lower portion.

A commercial application of the '810 patent is sold as the Lechuza-PON (geobra Brandstätter Stiftung & Co. KG; media.lechuza.com/Catalogs/lechuza-planters-assortment-catalogue-en-uk.pdf, page 15) system of planters. The manual for these planters describes transplanting of a conventionally cultivated plant into the self-watering planter followed by repeated irrigations from a watering can for 12 weeks (media.lechuza.com/lechuza-watering.pdf).

To supply a containerized plant with sufficient water for its needs from seed to harvest, two obstacles must be overcome. The first is space. In a conventional container approximately one third of the available space is occupied by soil media solids, another third is reserved for air penetration to avoid root zone hypoxia, leaving only one third of the available space for water. Some of the water in a conventional container is bound so tightly to the soil media solids as to be unavailable to the plant, further reducing the total volume in the container usable for functionally available water to the plant. As a result, perhaps 15% of the total volume in the pot may represent water that is available to the plant (Handreck, *Potting mixes and the care of plants growing in them*, Melbourne: CSIRO Division of Soils, 1985; ISBN:0643038124). The second obstacle is water conveyance, because as water is used in a self-watering system the reservoir water level drops, and transporting the water from a deep reservoir to the root system can exceed the capillary capacity of the material being used as a wick.

Negative pressure difference irrigation (NPDI, discussed in Semananda et al.) can overcome both of the above obstacles. This system uses an external reservoir placed below the plant container and connected with a tube. The tube end that is buried in the plant root zone is fitted with a porous ceramic fixture that allows plants to pull water from the reservoir via the tube using the force of suction created by plant transpiration. Although the effectiveness of NPDI is well documented, it too requires some initial conventional seedling cultivation as with NSW. Other drawbacks of NPDI include the need for an external reservoir, an arrangement of tubes that may be deemed unaesthetic, the expense of the specialized ceramic fixture, and a plant establishment protocol that can be cumbersome and nonintuitive for the home user.

SUMMARY OF THE INVENTION

It is an object of the invention to provide a subirrigation system that can support plant growth from seed planting to a mature plant. The subirrigation system can provide sufficient water within a reservoir for plant growth from seed to maturity, and preferably to a time of normal harvest for the plant in the case of crop plants. The systems described herein offer the following advantages as compared to the prior art:

- Passive aeroponic irrigation as a component means of water supply to the plant roots;
- Root growth restriction to a narrow (about 0.5-2 cm layer, optimally 1 cm) layer of soil media, thereby allowing for 83% of the planter height to serve as a self-contained nutrient-infused water reservoir;
- Planter reservoir capacity for seed-to-harvest plant growth for edible leafy green plants without the need for any subsequent irrigation or reservoir refilling by the user following setup.

The time of maturity/harvest can vary between plant species, but for purposes of the present invention is defined as 6-10 weeks of growth from the time of seed planting at 65-85° F., optimally 70-82° F. A list of time from seed to maturity/harvest for exemplary plant species (hortnews.extension.iastate.edu/vegetable-harvest-guide) is provided in table 1:

| Vegetable | Days to Maturity |
|---|---|
| Beet | 50-70 |
| Carrot | 60-80 |
| Cucumber, Pickling | 55-65 |
| Cucumber, Slicing | 55-65 |
| Green Bean, Snap Bean, Wax Bean | 50-70 |
| Kohlrabi | 55-70 |
| Lettuce (leaf) | 45-60 |
| Melon, Honeydew | 65-100 |
| Muskmelon & Cantaloupe | 75-100 |
| Okra | 50-65 |
| Onion, Green | 30-50 |
| Parsnip | 110-130 |
| Peas, Snow (Sugar) | 55-85 |
| Peas, Snap | 55-85 |
| Peas, Garden (Shell) | 55-85 |
| Peppers | 75-120 |
| Pumpkin | 85-120 |
| Radish, Spring | 25-40 |
| Radish, Winter | 45-70 |
| Shallots | 90-120 |
| Spinach | 45-60 |
| Summer Squash, Scallop | 50-60 |
| Summer Squash, Zucchini | 50-60 |
| Sweet Corn | 70-105 |
| Sweet Potato | 100-125 |
| Tomatillos | 75-100 |
| Tomatoes | 45-90 |
| Turnip | 45-70 |
| Watermelon | 80-100 |
| Winter Squash | 85-120 |

In a first aspect, the invention provides an assembly that includes a reservoir for containing a liquid plant nutrient solution, and a shallow chamber supported at the surface of said reservoir. The shallow chamber comprises two parts:

(i) a horizontal tray that is attached to the top of and supported by the reservoir and contains a thin layer of rooting media. The rooting media extends continuously into the reservoir below the tray using hollow tubular columns that are porous and are vertically suspended by the tray. The horizontal tray also contains drain holes that serve to further aerate the rooting media and allow for drainage in the occurrence of water inadvertently entering the rooting chamber, most likely from rainfall. Such drainage is important for preventing the development of a hypoxic environment for the roots; and (ii) a porous lid that allows for the passage of external air into the chamber but also restricts water vapor loss from within the chamber to the external environment. The lid also contains a central column that extends below the lid to near the surface of the rooting media in the tray and serves to anchor the plant to the apparatus using a spongy plug that fits snugly within the column.

As described hereinafter, the evaporation barrier function of the lid preserves the limited supply of nutrient-containing water in the reservoir. The recirculation of water from condensate dripping from the lid to the surface of the tray media also prevents the hypersalinization of the media.

In various embodiments, the rooting media may be sand, soil, peat moss, coconut husk, vermiculite, perlite, or combinations thereof. This list is not meant to be limiting. Suitable root media is described, for example, in Argo, Horttechnology 8(4): 481-485, 1998; DOI: 10.21273/horttech.8.4.481.

In accordance with a non-limiting embodiment of the invention a method is provided for filling the reservoir with water and adding nutrients to a concentration that is sufficient to provide for the needs of the plant from the time of seed planting to the time of harvest. The tray is subsequently attached to the top of the filled reservoir. Rooting media is added into hollow tubular porous containers that are lowered into the reservoir through openings in the tray. The vertically oriented containers are supported by the tray via flanges that extend outward from the upper open end of the containers. Rooting media is subsequently added to the tray and thereby becomes continuous with the rooting media in the vertically oriented containers suspended in the reservoir. Nutrient solution from the reservoir then wicks up into the horizontal tray media using the capillary capacity inherent in the media. The lid is subsequently attached to the horizontal tray and a moistened spongy plug with seeds affixed to the upper surface is inserted into the central support column of the lid until it touches the surface of the rooting media. A translucent plastic cup is inverted and attached to the lid over the spongy plug to preserve moisture in the plug, and is removed when seedling growth expands to fill the cup. Plant roots grow within and atop of the rooting media in the horizontally oriented tray and are irrigated from condensate that drips downward from the inner surface of the lid, condensate that forms directly onto said aerial roots, and by nutrient solution that wicks upward from the reservoir. All roots are highly aerated due to their proximity to open air space above the porous lid. Total growth time for modest-sized leafy green food plants (e.g., basil, spinach, lettuce, and kale) grown under moderate temperature, humidity, and wind conditions varies over approximately 6-10 weeks, and the reservoir provides sufficient water and nutrients over this period such that no reservoir replenishments are needed during this period. If multiple harvests from the same plant are performed, or if a large plant is grown, or if a scaled-down version of the planter is used, reservoir replenishment may be performed by lifting the tray, lid, and plant away from the reservoir as a single unit so that additional nutrient solution can be added.

DETAILED DESCRIPTION OF THE INVENTION

Figure 1:
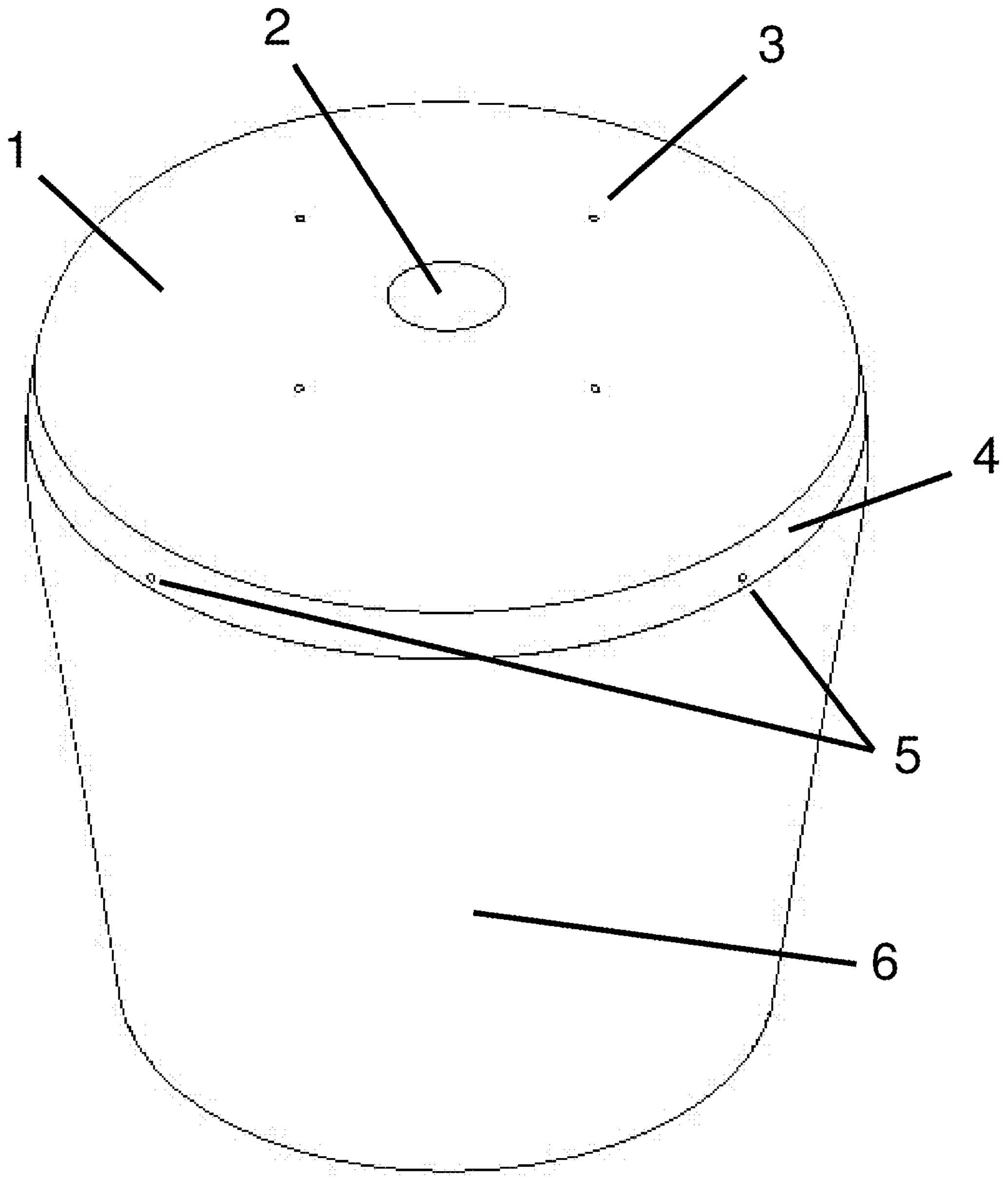
FIG. 1 An external view of the assembled apparatus showing three parts: 1) the lid, with center hole for planting and four smaller aeration holes, 2) the rooting tray beneath the lid, with two of four aeration holes visible, and 3) the reservoir beneath the rooting tray.

An external view of the assembled apparatus is depicted in FIG. 1. Three components are visible from this view: a lid (1), a rooting tray (4), and a reservoir (6), described as follows.

The apparatus measures 28.2 cm in total height with a maximum width of 28.3 cm. The three components visible in FIG. 1 measure: 3.2 cm for the lid (1), 11% of the total height; 1.8 cm for the rooting tray (4), 6% of the total height; 23.3 cm for the reservoir (6), 83% of the total height. The lid (1) has a central planting hole (2) with a 4 cm diameter. The central planting hole is the upper opening of a vertically oriented column with a 3.2 cm depth and is hereafter referred to as the planting column. The planting column is physically attached to the underside of the lid (1) and functions to support a spongy planting plug with seeds affixed onto the upper surface. Multiple aeration holes (3) with diameters of 0.3 cm are present in the lid. These holes are small openings in the lid with no associated column on the underside of the lid. They are relatively small to permit gas exchange with the external environment while allowing only a small amount of water vapor loss. The aeration holes (3) create an aerated rooting environment, essential for root health in plants lacking specialized adaptations to flooded conditions. The majority of common food plants lack such adaptations.

Rooting tray (4) also has aeration holes (5) with diameters of 0.3 cm, two of which are visible in the figure. The aeration holes (5) in the rooting tray serve an additional drainage function should excessive water enter the tray via the planting column during a heavy rainfall. The reservoir (6) contains a nutrient solution of sufficient volume (9 liters) to supply the plant with both water and mineral nutrients from the time of germination up to a harvestable stage.

Figure 2:
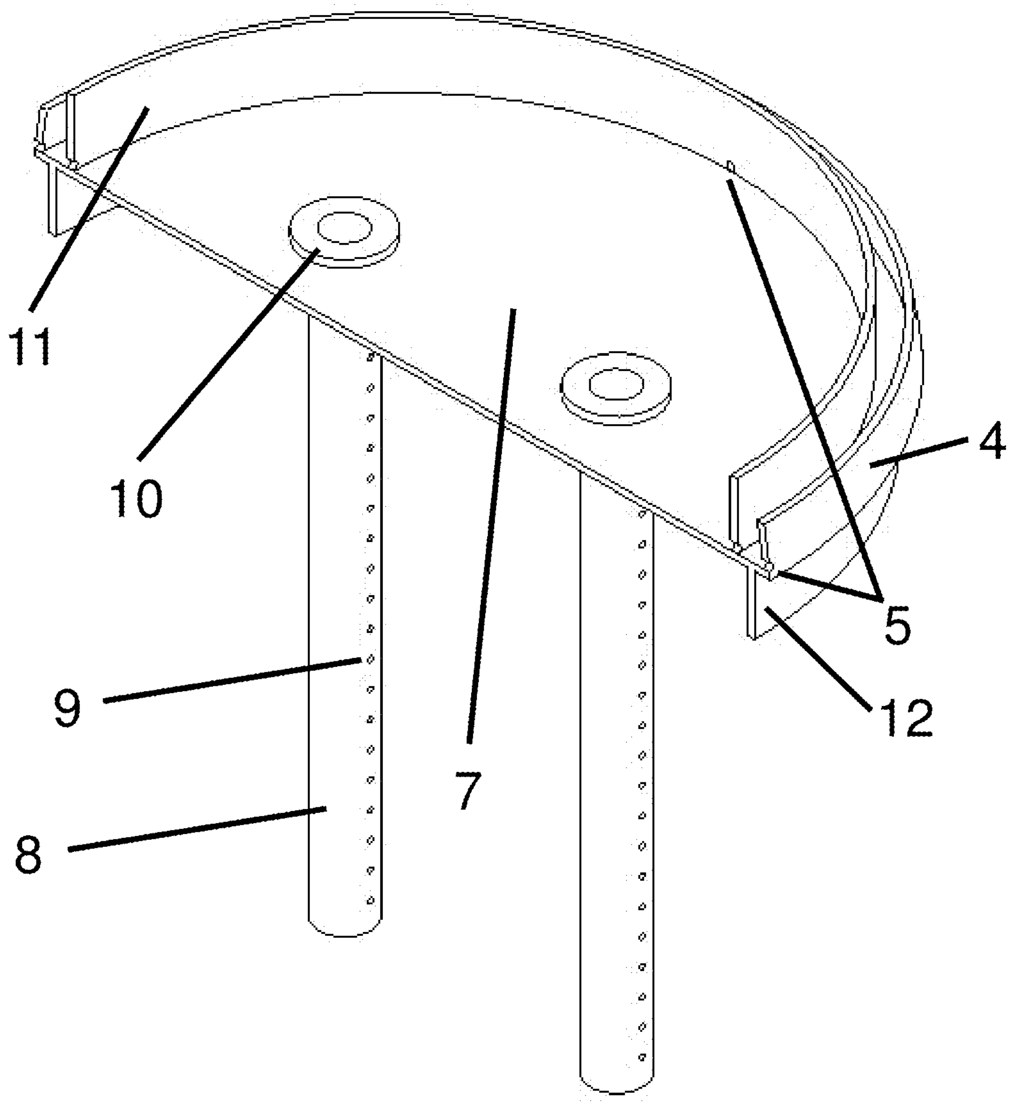
FIG. 2 Isolated and cutaway view of central rooting tray. Thin layer of rooting media contained horizontally in the tray is continuous with media contained vertically in porous columns that extend beneath the tray.

An isolated and cutaway view of rooting tray (4) is depicted in FIG. 2. A 1 cm depth of fine-textured rooting media is spread across the horizontal rooting tray surface (7) in a walled circle of diameter 25.1 cm. Sand is an example of a suitable fine-textured media. The same media fills vertically oriented porous columns (8) that extend beneath tray (7) to within 0.75 cm of the reservoir bottom and are hereafter referred to as media columns. Inside diameter of the media columns is 1.5 cm. Media in media columns (8) is continuous with that spread on horizontal rooting tray surface (7). A series of 2 mm diameter holes (9) in media columns (8) run from the top to the bottom and are large enough to permit water entry but small enough to contain the media. Media columns (8) have a closed end at the bottom; the top end is open and has a flange (10) by which the media column is suspended on horizontal tray (7). The rooting media on rooting tray (7) is contained within the rooting tray by an inner wall (11). Inner wall (11) also serves as a compression fitting with an analogous vertical wall extending down from lid (1), an arrangement shown in FIG. 3.

Other suitable geometries and numbers of extensions into the reservoir can be used provided they effectively wick nutrient solution into the layer of media on the horizontal rooting tray. A second wall (4) is present on the rooting tray (7). This second wall is part of the exterior surface of the apparatus and secures the rooting tray between the apparatus lid and reservoir. Multiple sets of aligned aeration holes (5) are present near the base of the inner and exterior walls of the rooting tray (7). These holes provide additional aeration into the rooting media and serve an additional drainage function should excessive water enter into the rooting chamber through the planting column (15) during a heavy rainfall event. Without these aeration holes (5), the rooting media could become saturated with water and hypoxic, a detrimental condition for the root systems of common food plants. A third wall (12) extends downward below the rooting tray (7) and serves as a compression fitting with a vertical surface on the inside rim of the reservoir (6), an arrangement (13) that can be viewed in FIG. 3.

Figure 3:
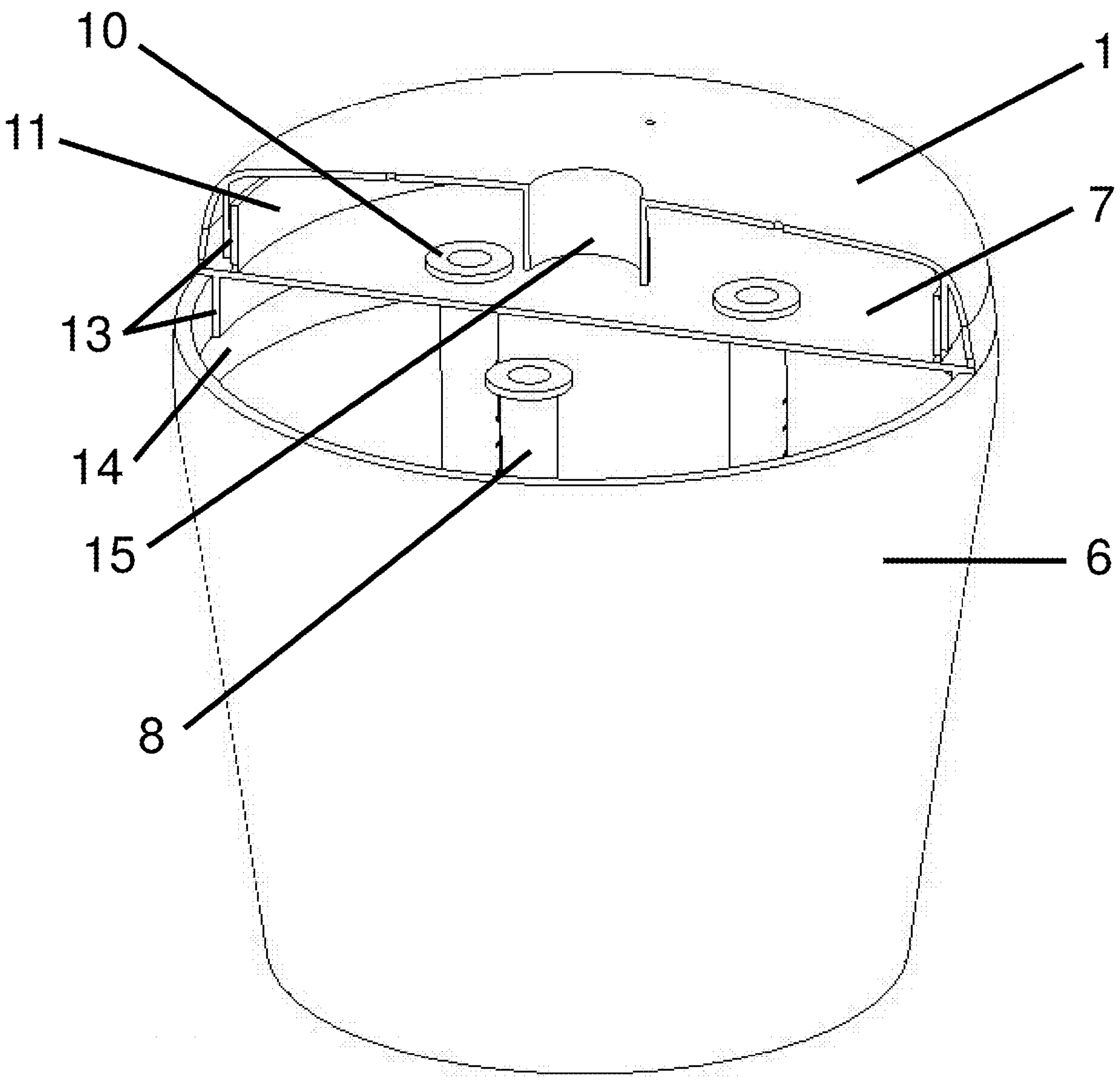
FIG. 3 Assembled apparatus with cutaway views of tray and lid.
Figure 4:
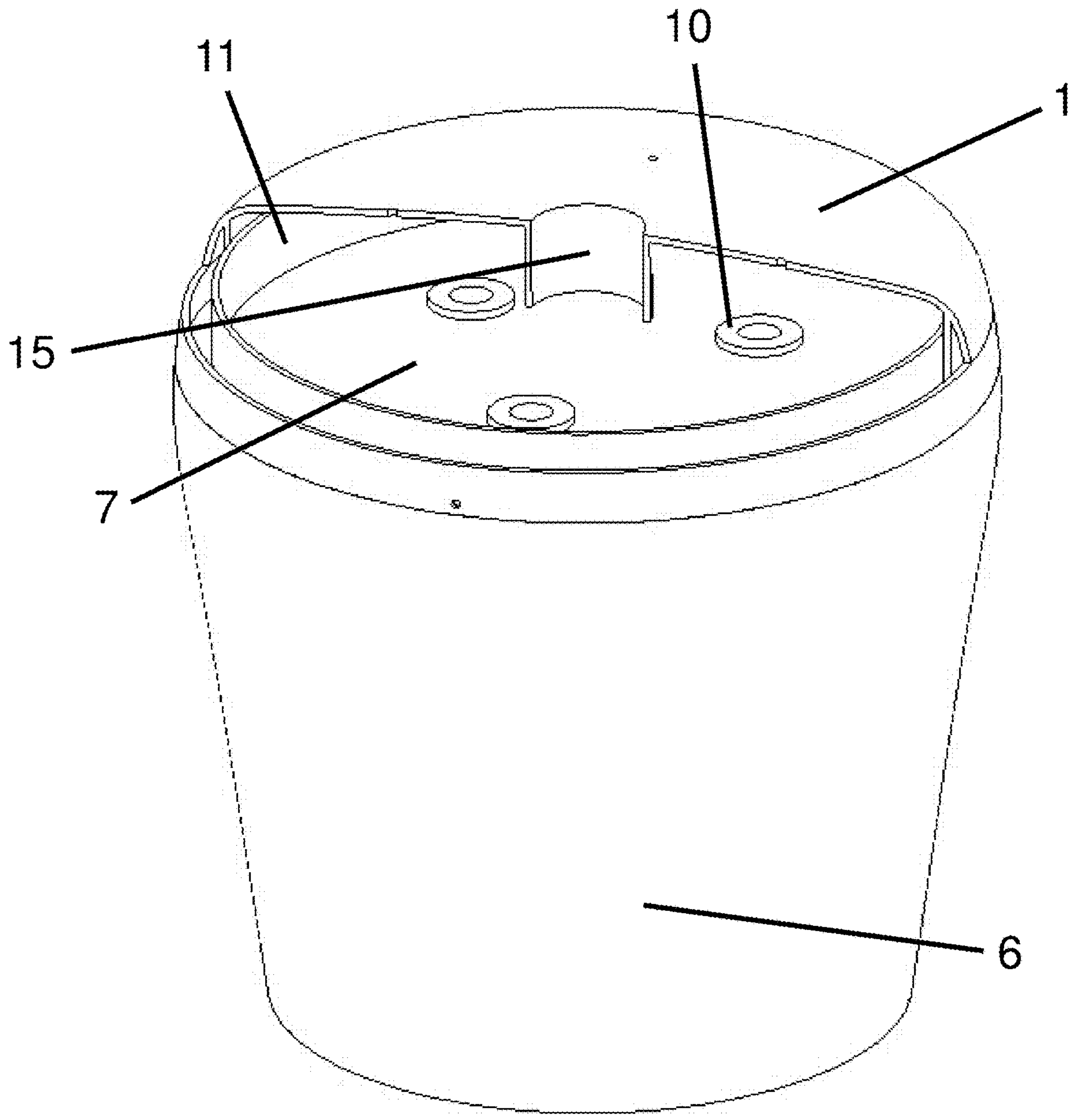
FIG. 4 Assembled apparatus with cutaway view of lid.

The assembled apparatus with cutaway views of the rooting tray (7) and lid (1) are shown in FIG. 3. For clarity, a view of the apparatus from the same angle but with only the lid (1) cutaway is shown in FIG. 4. The two sites of compression fitting (13) are shown in FIG. 3. These compression fittings fasten the lid (1) to the tray (7) and the tray to the reservoir (6). Because the shape of the reservoir (6) is tapered, being wider at the top than at the base, creating a vertical surface on the inner rim of the reservoir slightly thickens the rim relative to the thickness of the remainder of the reservoir. This added thickness provides additional strength to support and stabilize the rooting tray (7). This thickened rim tapers (14) until it is reduced to the uniform thickness composing the remainder of the reservoir (6). A cutaway view of the planting column (15) that projects downward from the surface of the lid (1) is shown in FIG. 3. A complete view of the rooting tray (7) is shown in FIG. 4. As shown in FIG. 4, the inner wall (11) of the rooting tray completely encircles the rooting tray surface (7) to contain the rooting media. FIG. 4 also shows the relative shallowness of the chamber created by the rooting tray (7) and lid (1) as compared to the large volume of the reservoir (6); specifically, the height of the liquid reservoir comprises 83% of the total height of the planter. The small amount of air space between the surface of the rooting media and the lid (1) is readily humidified from the evaporation of moisture wicked into the rooting media on the rooting tray surface (7).

Figure 5:
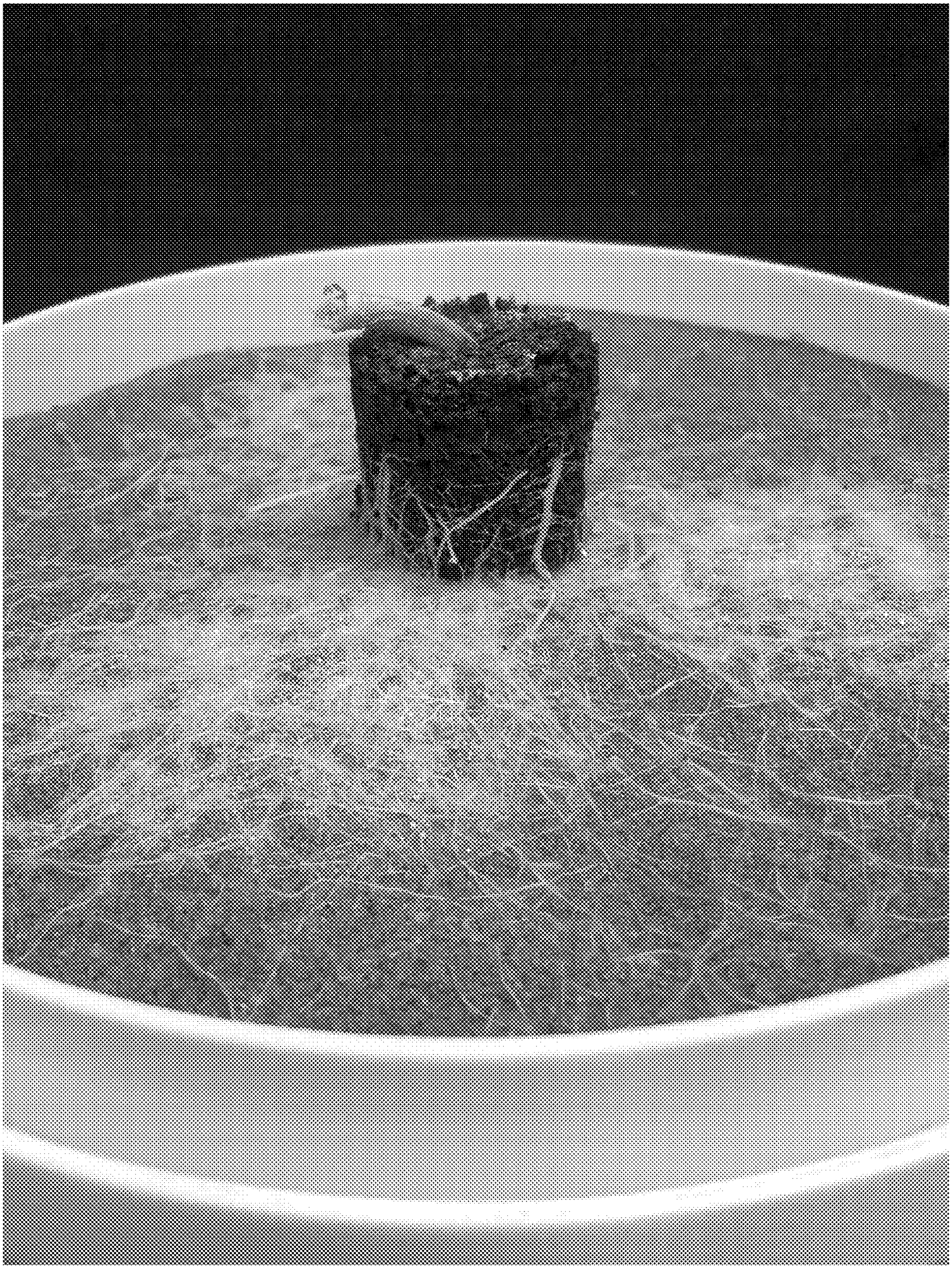
FIG. 5. Photograph of aerial roots produced by said apparatus. Shoot system harvested (in this case, of collard greens) and lid removed to reveal root system.

FIG. 5 presents an example of measured temperature and relative humidity data collected at one minute intervals in the rooting chamber and the surrounding ambient conditions over a six day period. The apparatus was placed outdoors during this period. As can be seen in this figure, temperature within the rooting chamber closely tracked ambient temperature. However, while ambient relative humidity fluctuated between 28-94%, relative humidity within the rooting chamber remained relatively constant at between 98-100%.

Figure 6:
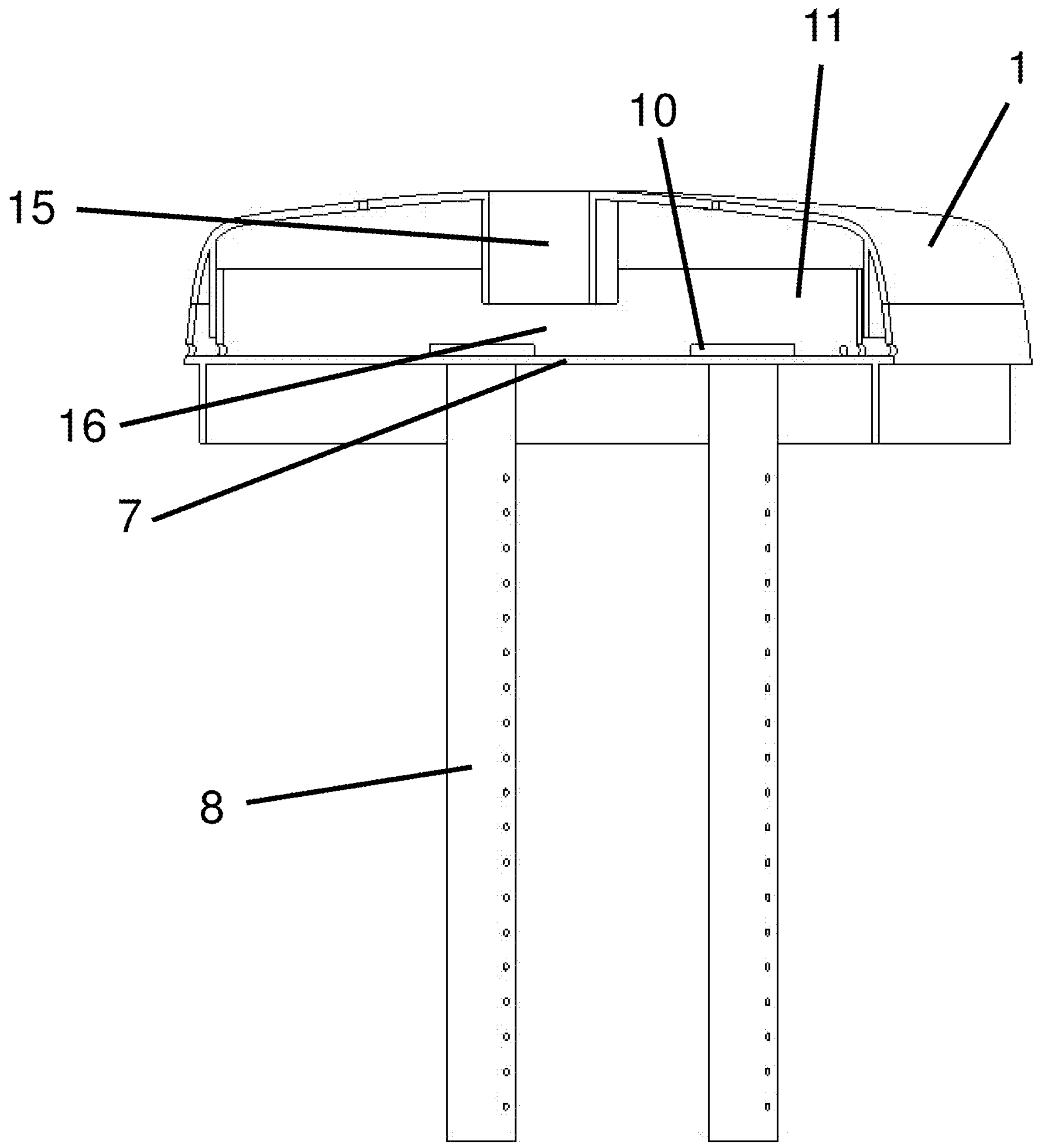
FIG. 6 Oblique angle view of cutaway lid and horizontal rooting tray that illustrates the depth of the planting column component of the lid and its depth relative to the horizontal tray.

When rooting chamber relative humidity reaches 100%, water vapor condenses directly onto the aerial roots and onto the inner surface of the lid (1), thereafter dripping directly from the lid and onto aerial roots produced within the rooting chamber space. The direct irrigation of aerial roots is a process referred to as aeroponics. Aeroponics is generally accomplished using a reservoir, a submerged electric pump, a mist nozzle, and a hose connecting the pump and nozzle. In this apparatus the aeroponic principle of irrigating aerial roots is the same but the process is completely passive, using neither an electric pump nor mechanical parts. A photograph of aerial roots produced by this apparatus is shown in FIG. 6.

In FIG. 3 and FIG. 4, the planting column (15) is displayed but its depth relative to the rooting tray (7) is not visualized in these figures. To clarify this relationship, a 1.5 cm gap (16) between the bottom of the planting column (15) and the rooting tray (7) is illustrated in the oblique side view of FIG. 7. The gap (16) shown in FIG. 7 provides space for the rooting media layer and also a passage for root growth from the spongy planting plug to within and atop of the rooting media. The spongy planting plug is of a depth such that, following insertion into the planting column (15), the top surface of the plug is even with the top surface of the lid (1), and the bottom surface of the plug touches the surface of the rooting media, thereby filling the air gap between the bottom of the planting column (15) and the surface of the rooting media.

Assembly and planting of the apparatus is as follows. The reservoir (6) is first filled with water to a level just below where the underside of the rooting tray (7) will be once it is installed. Fertilizer is then mixed into the water until completely dissolved. The specific fertilizer recipe needed will vary among different plants that can be grown in the apparatus. The rooting tray (7) is then fit into position at the top of the reservoir (6) without the media columns (8). The media columns (8) are then individually filled with rooting media and lowered into the reservoir (6) until suspended by a flange (10) on the open end of the column that rests on the rooting tray (7). Rooting media is then spread evenly across the surface of the rooting tray (7) to a depth of approximately 1 cm. This horizontal layer of media covers the upper ends of the media columns (10) and therefore forms a continuous matrix of material from the perimeter of the tray (11) through to the bottom of the media columns (8).

Prior to installation of the lid (1), visual confirmation of wetting of the rooting tray media is obtained. Following assembly, full wetting of the initially dry media takes approximately 10 minutes. After installation of the rooting media, the lid (1) is fit into position on top of the rooting tray (7). The premoistened spongy planting plug is then inserted into the planting column (15) with the affixed seeds on the upper surface. The planting plug is pushed into the planting column (15) until the bottom end of the plug is snug against the rooting media. To prevent plug drying during seed germination and early plant growth, a small translucent plastic cup is temporarily affixed to the lid, covering the plug. The timing of removal of the plastic cup will depend on the pace of growth of the plant being grown and also should ideally be timed when average wind speed is low. For many common food plants being grown for harvestable leaves, no further irrigation is necessary until the time of harvest. When any plant has grown to a large size and is therefore using a relatively large amount of water each day, the status of the remaining water in the reservoir (6) can be checked by lifting off the rooting tray (7) and media columns (8), lid (1), and the plant as a single unit and refilling as needed.

The amount of water transpired by the plant depends on the rate of leaf area development (the greater the leaf area, the higher the rate of transpiration) combined with environmental conditions (e.g., dry, warm, windy conditions lead to more water loss compared to humid, cool, calm conditions). In one example, a planter of the present invention was constructed to hold 9 liters of nutrient solution. Malabar spinach used slightly less than 8 liters from seed to flowering, and flowering is past the time of harvest. Collards, with very large leaves, used 6.6 liters to get to a harvestable stage when grown late summer through fall. Basil grown indoors under a grow light may only consume about 5 liters. While the number/volume/length of columns is not critical dispersing several within the container is preferred. With a single column, roots tend to congregate near the column and roots will preferentially proliferate there.

One skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described and exemplified in sufficient detail for those skilled in this art to make and use it, various alternatives, modifications, and improvements should be apparent without departing from the spirit and scope of the invention. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patent applications, patents, publications, and other references mentioned in the specification are indicative of the levels of those of ordinary skill in the art to which the invention pertains and are each incorporated herein by reference. The references cited herein are not admitted to be prior art to the claimed invention.

Unless otherwise defined, all technical and scientific terms used herein have the same meaning as commonly understood by one of ordinary skill in the art to which this invention belongs. In the case of conflict, the present specification, including definitions, will control.

The use of the articles "a", "an", and "the" in both the description and claims are to be construed to cover both the singular and the plural, unless otherwise indicated herein or clearly contradicted by context. The terms "comprising", "having", "being of" as in "being of a chemical formula", "including", and "containing" are to be construed as open terms (i.e., meaning "including but not limited to") unless otherwise noted. Additionally, whenever "comprising" or another open-ended term is used in an embodiment, it is to be understood that the same embodiment can be more narrowly claimed using the intermediate term "consisting essentially of" or the closed term "consisting of".

The term "about", "approximately", or "approximate", when used in connection with a numerical value, means that a collection or range of values is included. For example, "about X" includes a range of values that are ±20%, ±10%, ±5%, ±2%, ±1%, ±0.5%, ±0.2%, or ±0.1% of X, where X is a numerical value. In one embodiment, the term "about" refers to a range of values which are 10% more or less than the specified value. In another embodiment, the term "about" refers to a range of values which are 5% more or less than the specified value. In another embodiment, the term "about" refers to a range of values which are 1% more or less than the specified value.

Recitation of ranges of values are merely intended to serve as a shorthand method of referring individually to each separate value falling within the range, unless otherwise indicated herein, and each separate value is incorporated into the specification as if it were individually recited herein. A range used herein, unless otherwise specified, includes the two limits of the range. For example, the terms “between X and Y” and “range from X to Y, are inclusive of X and Y and the integers there between. On the other hand, when a series of individual values are referred to in the disclosure, any range including any of the two individual values as the two end points is also conceived in this disclosure.

The invention illustratively described herein suitably may be practiced in the absence of any element or elements, limitation or limitations which is not specifically disclosed herein. Thus, for example, in each instance herein any of the terms “comprising”, “consisting essentially of” and “consisting of” may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Other embodiments are set forth within the following claims.

What is claimed is:

1. An assembly configured for the cultivation of a plant, comprising:

a reservoir comprising an open top and forming a first chamber configured to hold a volume of liquid;

a tray comprising a substantially flat surface configured to mount to the reservoir and enclose the open top of the reservoir and a peripheral wall that, together with the substantially flat surface, forms an open second chamber, wherein the tray is configured to receive a layer of rooting media across the substantially flat surface for the roots of a plant growing within the second chamber and to maintain the rooting media at a level above the volume of liquid in the first chamber of the reservoir;

one or more columns configured to be reversibly inserted into a hole in the substantially flat surface of the tray, each column comprising (i) a proximal end terminating within the second chamber at or above the substantially flat surface of the tray, (ii) a flange at the proximal end configured to retain the column within the hole by contact with substantially flat surface of the tray, (iii) a closed distal end terminating within the internal volume of the reservoir, (iv) an internal hollow volume, and (v) a first aperture at the proximal end operably connected to the internal hollow volume, wherein the column is configured to receive rooting material into the internal hollow volume through the first aperture and to maintain the rooting material therewithin in physical contact with the rooting material within the tray, and wherein at least a portion of the column within the internal volume of the reservoir comprises one or more second apertures configured to allow the liquid within the first chamber to enter the internal hollow volume; and a lid configured to mount to the tray and enclose the open second chamber, wherein the lid comprises an inner surface configured to face the substantially flat surface of the tray, at least one approximately hollow cylindrical column projecting inward from the lid towards, but not contacting, the flat surface of the tray, and one or more aeration openings.

2. A method of plant growth, comprising:

providing an assembly comprising;

a reservoir comprising an open top and forming a first chamber configured to hold a volume of liquid;

a tray comprising a substantially flat surface configured to mount to the reservoir and enclose the open top of the reservoir and a peripheral wall that, together with the substantially flat surface, forms an open second chamber, wherein the tray is configured to receive a layer of rooting media across the substantially flat surface for the roots of a plant growing within the second chamber and to maintain the rooting media at a level above the volume of liquid in the first chamber of the reservoir;

one or more columns configured to be reversibly inserted into a hole in the substantially flat surface of the tray, each column comprising (i) a proximal end terminating within the second chamber at or above the substantially flat surface of the tray, (ii) a flange at the proximal end configured to retain the column within the hole by contact with substantially flat surface of the tray, (iii) a closed distal end terminating within the internal volume of the reservoir, (iv) an internal hollow volume, and (v) a first aperture at the proximal end operably connected to the internal hollow volume, wherein the column is configured to receive rooting material into the internal hollow volume through the first aperture and to maintain the rooting material therewithin in physical contact with the rooting material within the tray, and wherein at least a portion of the column within the internal volume of the reservoir comprises one or more second apertures configured to allow the liquid within the first chamber to enter the internal hollow volume; and a lid configured to mount to the tray and enclose the open second chamber, wherein the lid comprises an inner surface configured to face the substantially flat surface of the tray, at least one approximately hollow cylindrical column projecting inward from the lid towards, but not contacting, the flat surface of the tray, and one or more aeration openings;

introducing a liquid into the liquid reservoir and filling to a level below the height of the lower surface of the tray after it is mounted;

mounting the tray onto the reservoir;

filling the one or more hollow cylindrical columns with rooting media and lowering the hollow cylindrical columns into the filled reservoir through the tray openings until the flange of each column contacts the tray;

adding and spreading rooting media across the flat surface of said tray to a depth such that the plant growth media forms a continuous capillary liquid flow path from the openings in the said one or more hollow cylindrical columns and into the said one-centimeter layer of rooting media resting on the tray surface;

mounting said lid to the horizontal tray base, wherein an upper surface of the rooting media on the flat surface of the tray is separated from the lid by an air space;

introducing a spongy matrix into the at least one approximately hollow cylindrical column of the lid such that the spongy matrix contacts the rooting media in the tray, wherein the spongy matrix comprises one or more plant seeds in and/or on the spongy matrix;

covering the at least one approximately hollow cylindrical column of the lid with a cover, wherein the cover is optionally transparent to one or more wavelengths of visible light.

3. A method according to claim 2, wherein aerial roots that grow on and above the upper surface of the rooting media and roots that grow within the rooting media are continuously moistened by (i) passive dripping of water that collects on the inner surface of the lid due to humidity within the second chamber, (ii) direct condensation onto the aerial roots, and (iii) wicking of water from the first chamber through the rooting media in said columns and upward into rooting media in said tray.

* * * * *